(12) United States Patent
Okamura et al.

(10) Patent No.: US 11,181,178 B2
(45) Date of Patent: Nov. 23, 2021

(54) STRAIN WAVE GEAR SPEED REDUCER UNIT AND POWER UNIT

(71) Applicant: NIDEC-SHIMPO CORPORATION, Kyoto (JP)

(72) Inventors: Kikuo Okamura, Kyoto (JP); Hitoshi Inoue, Kyoto (JP)

(73) Assignee: NIDEC-SHIMPO CORPORATION, Kyoto (JP)

( * ) Notice: Subject to any disclaimer, the term of this patent is extended or adjusted under 35 U.S.C. 154(b) by 346 days.

(21) Appl. No.: 16/313,009

(22) PCT Filed: Jun. 22, 2017

(86) PCT No.: PCT/JP2017/023029
§ 371 (c)(1),
(2) Date: Dec. 22, 2018

(87) PCT Pub. No.: WO2017/222012
PCT Pub. Date: Dec. 28, 2017

(65) Prior Publication Data
US 2019/0226568 A1    Jul. 25, 2019

(30) Foreign Application Priority Data

Jun. 24, 2016 (JP) ............................. JP2016-125730

(51) Int. Cl.
*F16H 49/00* (2006.01)
*H02K 7/116* (2006.01)
(Continued)

(52) U.S. Cl.
CPC ............. *F16H 49/001* (2013.01); *F16H 1/32* (2013.01); *H02K 7/116* (2013.01); *H02K 21/24* (2013.01)

(58) Field of Classification Search
CPC ....... F16H 49/001; H02K 7/116; H02K 21/24
See application file for complete search history.

(56) References Cited

U.S. PATENT DOCUMENTS

| 6,065,362 A * | 5/2000 | Kiyosawa | F16H 49/001 74/460 |
| 2009/0062053 A1* | 3/2009 | Kobayashi | F16H 49/001 475/166 |

(Continued)

FOREIGN PATENT DOCUMENTS

| JP | S60166261 | 11/1985 |
| JP | H09217798 | 8/1997 |

(Continued)

OTHER PUBLICATIONS

Wikipedia contributors. (Mar. 31, 2016). Leaf spring. In Wikipedia, The Free Encyclopedia. Retrieved 21:08, May 6, 2021, from https://en.wikipedia.org/w/index.php?title=Leaf_spring&oldid=712806983 (Year: 2016).*

(Continued)

*Primary Examiner* — Joseph Brown
(74) *Attorney, Agent, or Firm* — JCIPRNET

(57) ABSTRACT

A strain wave gear speed reducer unit includes: a casing extending in the axial direction; an internal gear disposed to be rotatable relative to the casing and having internal teeth on the inner circumference; a flexible external gear disposed to the inside of the internal gear in the radial direction, an end of which is fixed to the casing on one side in the axial direction, and which has external teeth on the outer circumference for meshing with the internal teeth; a cam disposed to the inside of the external gear in the radial direction and deforming the external gear in the radial direction by rotating together with a rotating shaft of a motor unit; a connecting part formed integrally with the cam and connected to the rotating shaft on the inside of the external gear; and a support connected to the casing and rotatably supporting the connecting part.

12 Claims, 3 Drawing Sheets

(51) Int. Cl.
*F16H 1/32* (2006.01)
*H02K 21/24* (2006.01)

(56) References Cited

U.S. PATENT DOCUMENTS

2014/0157925 A1* 6/2014 Yajima .................. F16H 49/001
74/412 R
2015/0226302 A1* 8/2015 Handa .................. F16H 57/021
74/413
2016/0109014 A1* 4/2016 Murayama ............ F16H 49/001
74/640
2019/0312485 A1* 10/2019 Okamura ............. H02K 5/1735
2020/0003256 A1* 1/2020 Koroyasu ............. F16C 19/546

FOREIGN PATENT DOCUMENTS

JP       H09291983      11/1997
JP       2008039037     2/2008
JP       2012251603    12/2012

OTHER PUBLICATIONS

"International Search Report (Form PCT/ISA/210)" of PCT/JP2017/023029, dated Aug. 15, 2017, with English translation thereof, pp. 1-4.

* cited by examiner

STRAIN WAVE GEAR SPEED REDUCER UNIT AND POWER UNIT

CROSS-REFERENCE TO RELATED APPLICATION

This application is a 371 application of the international PCT application serial no. PCT/JP2017/023029, filed on Jun. 22, 2017, which claims the priority benefit of Japan application no. 2016-125730, filed on Jun. 24, 2016. The entirety of each of the abovementioned patent applications is hereby incorporated by reference herein and made a part of this specification.

TECHNICAL FIELD

The present invention relates to a strain wave gear speed reducer unit.

BACKGROUND ART

Conventionally, speed reducers with various configurations are known as speed reducers that reduce rotation speeds and output the rotation of rotating shafts of electric motors. Patent Literature 1, for example, discloses a speed reducer using a strain wave gear mechanism. This strain wave gear speed reducer has an elliptical wave generator, a flexible flex spline formed in a circular shape coming in contact with the wave generator via a bearing positioned on the outer circumference of the wave generator having spline-shaped teeth on its outer circumference, and a circular spline having a larger number of spline teeth in a ring shape than the number of teeth of the flex spline which mesh and engage with the outer circumference of the flex spline.

In the above-described strain wave gear speed reducer mechanism, for example, in a case where the wave generator is connected to an input shaft, the circular spline is fixed, and the flex spline is connected to an output shaft, when the wave generator rotates once in the clockwise direction, the flex spline rotates in the counterclockwise direction according to the difference in the number of teeth with respect to the circular spline. On the other hand, in a case where the flex spline is fixed and the circular spline is connected to an output shaft, the circular spline rotates according to the difference in the number of teeth with respect to the flex spline.

In that manner, the speed of rotation input to the wave generator is reduced using the difference in the number of teeth between the circular spline and the flex spline and then the rotation is output from the flex spline or the circular spline in the above-described strain wave gear speed reducer.

FIG. 1 of Patent Literature 1 discloses a configuration in which a strain wave gear speed reducer is connected to a rotating shaft of a drive motor. In the configuration of FIG. 1, the weight of the whole device is large, and the coupling unit connecting the rotating shaft to the strain wave gear speed reducer causes the size of the entire device to be larger and the length thereof to be longer. For this reason, in the configuration disclosed in Patent Literature 1, the entire device is made compact by forming the speed reducer and the drive motor integrally. Specifically, in the configuration disclosed in Patent Literature 1, the rotor of the drive motor and the wave generator of the speed reducer are formed integrally.

CITATION LIST

Patent Literature

[Patent Literature 1]
Japanese Unexamined Utility Model Application Publication No. S 60-166261

SUMMARY OF INVENTION

Technical Problem

In the case where the speed reducer and the drive motor are formed integrally as disclosed in Patent Literature 1 described above, however, it is necessary to individually design a dedicated speed reducer and drive motor. Thus, various types of speed reducer and drive motor need to be designed in accordance with applications, which may cause the problem of versatility.

Meanwhile, in a case where the drive motor and the speed reducer formed as individual members are combined as illustrated in FIG. 1 of Patent Literature 1 described above, although versatility of the speed reducer can be ensured, the combination of the speed reducer and the drive motor results in a large size for the device as described in Patent Literature 1 above.

Furthermore, in the case where the speed reducer and the drive motor formed as individual members are combined, connection of the speed reducer to the drive motor needs to be secured with high accuracy, and thus assembly workability may not be good. Specifically, in the case where the drive motor and the speed reducer formed as individual members are combined, the cam needs to be connected to the rotating shaft of the drive motor with high accuracy so that the flex spline (external gear) and the cam are positioned in the circular spline (internal gear) of the speed reducer at a predetermined position. Since dimensional accuracy is required when the drive motor is connected to the speed reducer, workability may not be good.

An objective of the present invention is to realize a configuration of a strain wave gear speed reducer unit which enables easy attachment to a drive motor in a compact size.

Solution to Problem

A strain wave gear speed reducer unit according to an embodiment of the present invention is a strain wave gear speed reducer unit that is rotatably connected to a rotating shaft of a motor having the rotating shaft extending in an axial direction. The strain wave gear speed reducer unit includes a cylindrical casing that extends in the axial direction, a ring-shaped internal gear that is disposed in the casing so as to be rotatable relative to the casing and has internal teeth on an inner circumference, a flexible ring-shaped external gear that is disposed to the inside of the internal gear in a radial direction, an end of which is fixed to the casing on one side in the axial direction, and has external teeth that mesh with the internal teeth on an outer circumference, an elliptical cam that is disposed to the inside of the external gear in the radial direction and deforms the external gear in the radial direction by rotating together with a rotating shaft, a connecting part that is formed integrally with the cam or fixed to the cam and is connected to the rotating shaft of the motor on the inside of the external gear, and a support that is connected to the casing and rotatably supports an outer circumference of the connecting part.

Advantageous Effects of Invention

According to strain wave gear speed reducer unit of an embodiment of the present invention, a strain wave gear speed reducer unit having a configuration that enables easy attachment to a motor in a compact size is obtained.

DESCRIPTION OF EMBODIMENTS

Figure 1:
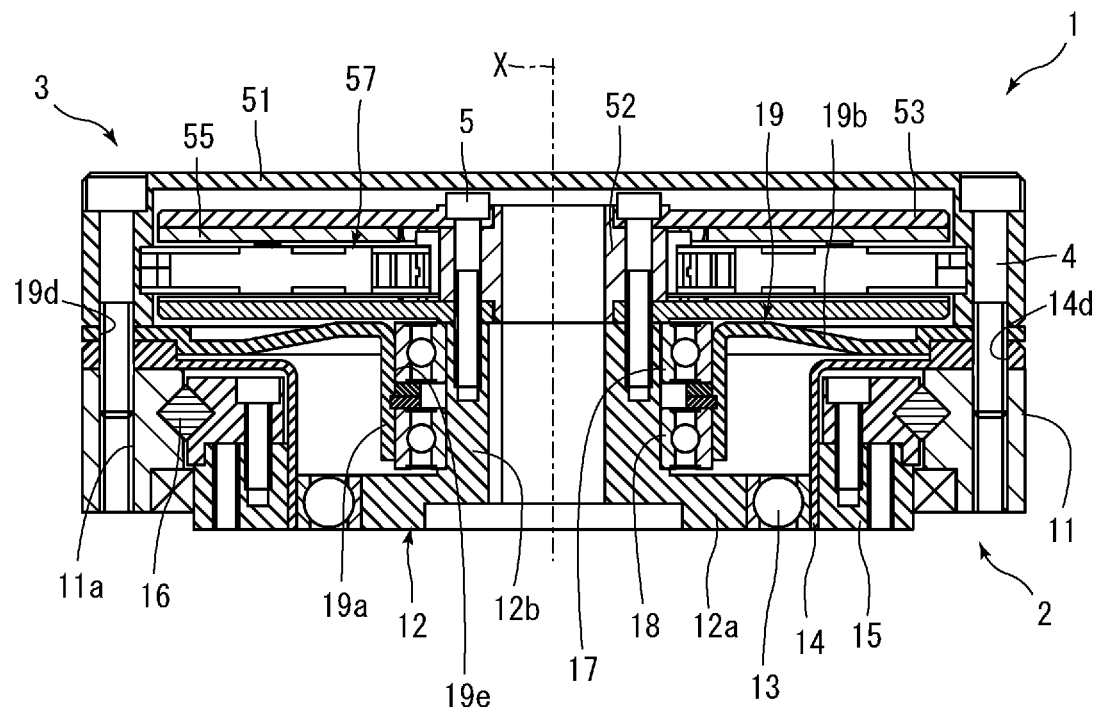
FIG. 1 is a cross-sectional diagram illustrating a schematic configuration of a power unit including a strain wave gear speed reducer unit according to an embodiment.

Embodiments of the present invention will be described below with reference to accompanying drawings. Note that the same reference numerals are given to the same or equivalent parts in the drawings and description thereof will not be repeated. In addition, dimensions of constituent members shown in each drawing may not fully represent actual dimensions of the constituent members, dimensional proportions of the constituent members, and the like.

Note that, in the following description, a direction parallel to a rotating shaft of an electric motor will be referred to as an "axial direction" or a "height direction," a direction orthogonal to the rotating shaft will be referred to as a "radial direction," and a direction along an arc around the rotating shaft will be referred to as a "circumferential direction," respectively. However, the "parallel direction" is assumed to also include a substantially parallel direction. In addition, the "orthogonal direction" is assumed to also include a substantially orthogonal direction.

(Overall Configuration)

FIG. 1 illustrates a schematic configuration of a power unit 1 including a strain wave gear speed reducer unit 2 according to an embodiment of the present invention. The power unit 1 includes the strain wave gear speed reducer unit 2 and a motor unit 3 (motor). The power unit 1 reduces a speed of rotation of a rotating shaft 52 of the motor unit 3, which will be described below, using the strain wave gear speed reducer unit 2 and outputs the rotation. The power unit 1 can be used as a power source for driving, for example, joints of robots, wheels of electric wheelchairs, and the like.

The strain wave gear speed reducer unit 2 and the motor unit 3 each have columnar shapes. The power unit 1 has the strain wave gear speed reducer unit 2 and the motor unit 3 of which the outer circumferences of both are connected by a plurality of bolts 4 while overlapping each other in the height direction (the top-bottom direction in FIG. 1). The power unit 1 has a columnar shape overall.

(Motor Unit)

The motor unit 3 is an axial gap-type brushless motor. The motor unit 3 is formed in a flat shape having a size in the radial direction (the left-right direction in FIG. 1 and FIG. 2) greater than a size in the height direction as illustrated in FIG. 1 and FIG. 2.

Figure 2:
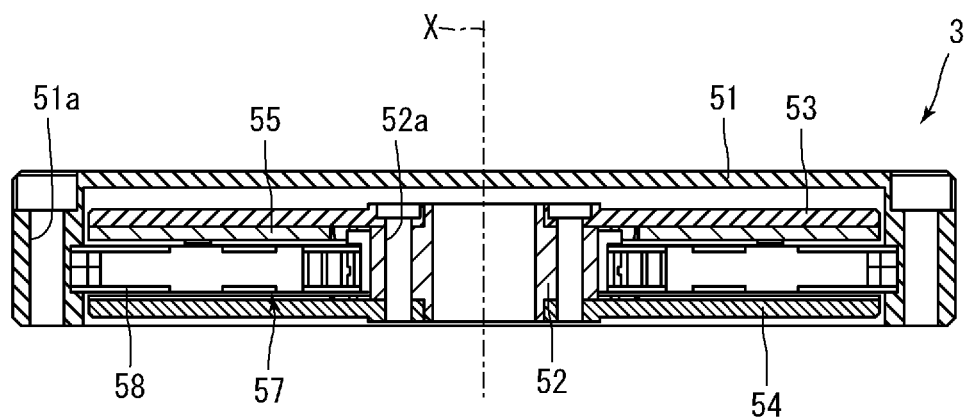
FIG. 2 is a cross-sectional diagram illustrating a schematic configuration of a motor unit.

The motor unit 3 includes a motor casing 51, a rotating shaft 52, rotor yokes 53 and 54, a rotor magnet 55, and coil core parts 57 as illustrated in FIG. 2.

The motor casing 51 is formed in a bottomed tubular shape extending in the direction in which an axis X extends (which will be referred to as an axial direction below). The axis X coincides with an axis X of the rotating shaft 52, which will be described below. The motor casing 51 houses the rotating shaft 52, the rotor yokes 53 and 54, the rotor magnet 55, and the coil core parts 57.

The motor casing 51 has a plurality of bolt holes 51a on the outer circumference into which the bolts 4 for connecting the motor unit 3 to the strain wave gear speed reducer unit 2 are inserted. The motor casing 51 is attached to the strain wave gear speed reducer unit 2 such that an opening part thereof is positioned at the strain wave gear speed reducer unit 2 side as illustrated in FIG. 1.

The rotating shaft 52 has a cylindrical shape extending in the axial direction as illustrated in FIG. 2. The rotating shaft 52 is disposed to be concentric with the motor casing 51. The rotating shaft 52 is disposed inside the motor casing 51 such that the end of the rotating shaft on the other side in the axial direction is positioned on the opening side of the motor casing 51. The rotating shaft 52 has a plurality of through holes 52a in the circumferential direction into which bolts 5 (see FIG. 1) for fixing the rotating shaft 52 to a connecting part 12b of a rotating body 12 of the strain wave gear speed reducer unit 2, which will be described below, are inserted.

The rotor yokes 53 and 54 are ring-shaped plate members. The rotor yokes 53 and 54 are fixed to both ends of the rotating shaft 52 in the axial direction. That is, the rotor yokes 53 and 54 are fixed to the rotating shaft 52 such that the rotor yokes extend from both ends of the rotating shaft 52 in the axial direction outward in the radial direction. Accordingly, the rotor yokes 53 and 54 are disposed to be parallel with each other inside the motor casing 51. Note that the rotor yokes 53 and 54 are fixed to the rotating shaft 52 using the bolts 5 (see FIG. 1) to be inserted into the through holes 52a of the rotating shaft 52.

The rotor magnet 55 has a ring shape and is fixed to the surface of the rotor yoke 53 facing the rotor yoke 54 (see FIG. 2). Although not illustrated, the rotor magnet 55 has different magnetic poles alternately positioned in the circumferential direction.

Figure 3:
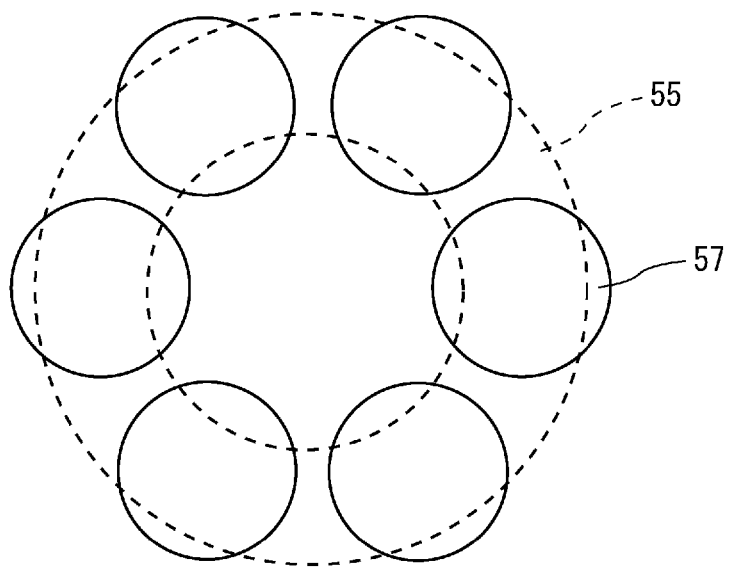
FIG. 3 is a diagram schematically illustrating a positional relationship between a rotor magnet and coil core parts in the motor unit when the motor unit is viewed in a thickness direction.

The coil core parts 57 are formed to have, for example, a columnar shape extending in the axial direction. A plurality of coil core parts 57 (six in the example of the present embodiment) are disposed in the motor casing 51 in the circumferential direction when the motor unit 3 is viewed in the height direction as schematically illustrated in FIG. 3. The coil core parts 57 are each sandwiched by ring-shaped plates 58 in the axial direction. Outer circumferential surfaces of the ring-shaped plates 58 are fixed to the inner circumferential surface of the motor casing 51. That is, the coil core parts 57 and the ring-shaped plate 58 correspond to stators of the motor. Although not particularly illustrated, the coil core parts 57 have wound coils on their side surfaces.

A gap is formed between the rotor magnet 55 and the coil core parts 57 in the axial direction of the rotating shaft 52. The axial gap-type motor unit 3 having the above-described configuration is formed in a more compact size in the height direction (the axial direction) than a radial gap-type motor having the same output performance.

(Strain Wave Gear Speed Reducer Unit)

Figure 4:
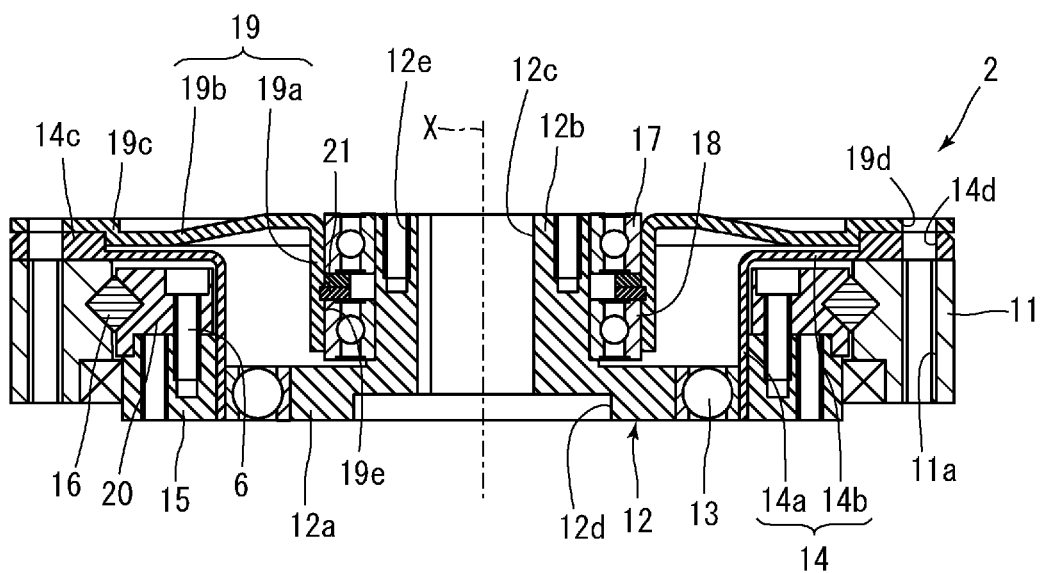
FIG. 4 is a cross-sectional diagram illustrating a schematic configuration of the strain wave gear speed reducer unit.

As illustrated in FIG. 1 and FIG. 4, the strain wave gear speed reducer unit 2 is formed in a flat shape having a size in the radial direction (the left-right direction in FIG. 1 and FIG. 4) greater than a size in the height direction (the top-bottom direction in FIG. 1 and FIG. 4). The stain wave gear speed reducer unit 2 imparts wave motions to an external gear 14 using a cam 12a rotating together with the rotating shaft 52 of the motor unit 3, and thereby transmits the rotation of the cam 12a to the external gear 14 or an internal gear 15.

Specifically, the strain wave gear speed reducer unit 2 includes a casing 11, the rotating body 12, a bearing 13, the external gear 14, the internal gear 15, a cross roller bearing 16, support bearings 17 and 18, and a support 19.

The casing 11 has a cylindrical shape extending in the direction in which an axis X extends (which will be referred to as an axial direction below). The axis X coincides with the axis X of the rotating shaft 52 of the motor unit 3 in a state in which the strain wave gear speed reducer unit 2 is attached to the motor unit 3. Thus, the axial direction coincides with the axial direction of the rotating shaft 52 of the motor unit 3.

The casing 11 includes a plurality of screw holes 11a penetrating the casing 11 in the axial direction on the circumferential direction. Bolts 4 (see FIG. 1) for connecting the motor unit 3 to the strain wave gear speed reducer unit 2 are inserted into the screw holes 11a. Note that the screw holes 11a form insertion holes for the bolts 4 in connection with through holes 14d and 19d formed in the external gear 14 and the support 19, which will be described below, disposed on one side of the casing 11 (the motor unit 3 side) in the axial direction as will be described below.

The rotating body 12 is disposed inside the casing 11. The rotating body 12 is connected to the rotating shaft 52 of the motor unit 3 and rotates integrally with the rotating shaft 52.

Specifically, the rotating body 12 has the elliptically plate-shaped cam 12a and the connecting part 12b. The cam 12a is elliptically formed when viewed in the axial direction. The connecting part 12b is formed at one side of the cam 12a in the thickness direction (the motor unit 3 side) to have a cylindrical shape extending in the thickness direction. The rotating body 12 is disposed inside the casing 11 such that the thickness direction of the cam 12a coincides with the axial direction and the connecting part 12b extends in the axial direction.

In the present embodiment, the cam 12a and the connecting part 12b are a single component. By combining the cam 12a and the connecting part 12b integrally, the number of components of the strain wave gear speed reducer unit 2 can be reduced and assembly workability of the strain wave gear speed reducer unit 2 can be improved.

The rotating body 12 has a through hole 12c penetrating the connecting part 12b and the cam 12a in the axial direction. The cam 12a has a recess 12d formed at an opening part of the through hole 12c.

The connecting part 12b has one end (end on one side) in the axial direction positioned in the inside of the support 19, which will be described below, in the axial direction when viewed in a direction orthogonal to the axial direction. Accordingly, it is possible to prevent the connecting part 12b from projecting to one side from the support 19 in the axial direction. Thus, the strain wave gear speed reducer unit 2 can be miniaturized in the axial direction.

The connecting part 12b has a plurality of bolt holes 12e at the end on the opposite side to the cam 12a. The bolts 5 penetrating the through holes 52a of the rotating shaft 52 in the motor unit 3 are fastened into the plurality of bolt holes 12e. Since the connecting part 12b is connected to the rotating shaft 52 of the motor unit 3 using the bolts 5 as illustrated in FIG. 1, the rotating body 12 rotates integrally with the rotating shaft 52 of the motor unit 3. Thus, the cam 12a rotates around the axis X when viewed in the axial direction.

The support bearings 17 and 18 are disposed in a row in the axial direction on the outer circumferential surface of the connecting part 12b as illustrated in FIG. 4. The connecting part 12b is supported by the support 19 fixed to the casing 11 in the axial direction and the radial direction of the casing 11 via the support bearings 17 and 18. That is, the support 19 is connected to the casing 11 and rotatably supports the outer circumference of the connecting part 12b. Accordingly, the rotating body 12 can be positioned with respect to the casing 11. In addition, since the support bearings 17 and 18 are disposed in a row in the axial direction on the outer circumferential surface of the connecting part 12b as described above, the rotating body 12 can be supported to be rotatable in a more reliable and stable state.

Figure 5:
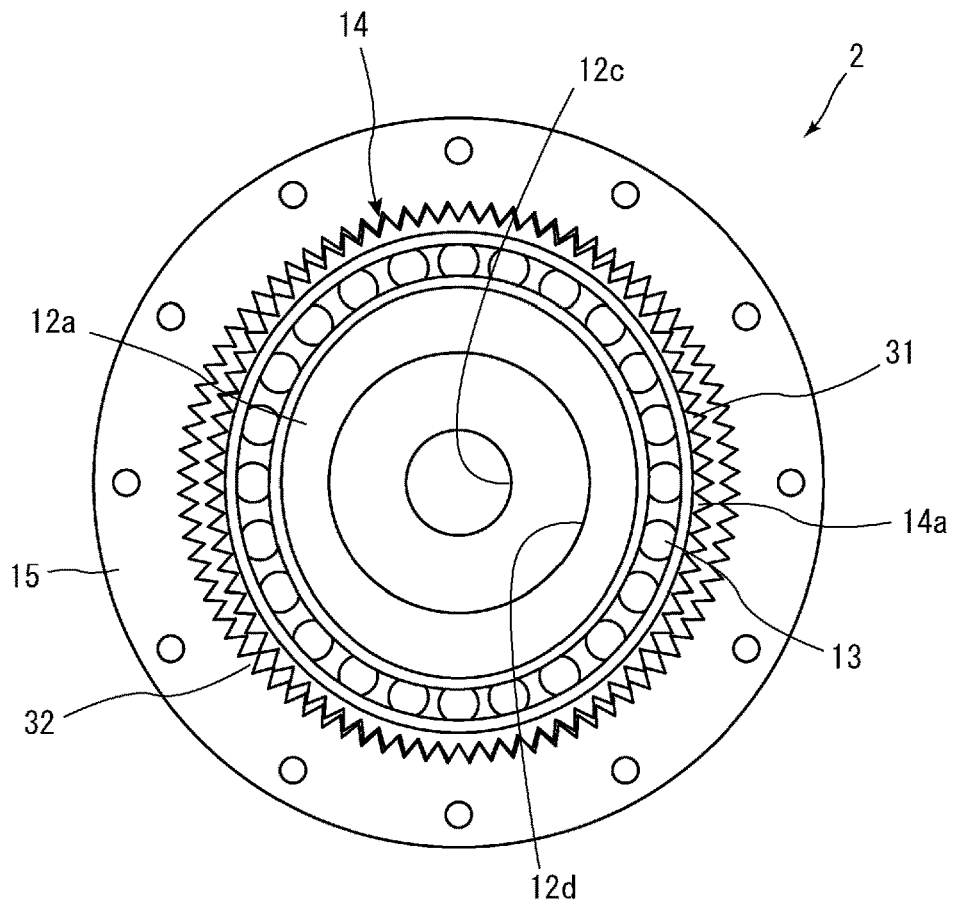
FIG. 5 is a diagram obtained by viewing an external gear, an internal gear, and a cam from the other side in an axial direction.

The external gear 14 with a flange formed in a cylindrical shape and the internal gear 15 formed in a ring shape are disposed inside the casing 11 to surround the cam 12a of the rotating body 12. That is, the external gear 14 is positioned on the outer side of the cam 12a in the radial direction, and the internal gear 15 is disposed on the outer side of the external gear 14 in the radial direction. FIG. 5 illustrates positional relationships between the external gear 14, the internal gear 15, and the cam 12a when the strain wave gear speed reducer unit 2 is viewed from the other side in the axial direction. Note that the casing 11 is not illustrated in FIG. 5.

The bearing 13 is disposed between the cam 12a and the external gear 14 when viewed in the axial direction. The bearing 13 is disposed between the cam 12a and the external gear 14 and is movable in the radial direction of the cam 12a in accordance with rotation of the cam 12a. Accordingly, when the elliptical cam 12a rotates, the end of the cam 12a in the longitudinal direction presses the inner circumference of the external gear 14 radially outward via the bearing 13.

The external gear 14 is formed of a flexible thin plate in a cylindrical shape having a flange as illustrated in FIG. 4. Specifically, the external gear 14 has a cylindrical part 14a covering the outside of the cam 12a in the radial direction and a flange part 14b extending radially outward on the one side in the axial direction in the cylindrical part 14a.

The cylindrical part 14a has a plurality of external teeth 31 (see FIG. 5) on its outer circumferential surface at a uniform pitch in the circumferential direction. The external teeth 31 are formed on the outer circumferential surface of the cylindrical part 14a to extend in the axial direction. The internal circumferential surface of the cylindrical part 14a comes in contact with the bearing 13 disposed on the outer circumference of the cam 12a. Thus, when the elliptical cam 12a rotates, the end of the cam 12a in the longitudinal direction can deform the cylindrical part 14a in the radial direction via the bearing 13. In this manner, wave motions can be imparted to the cylindrical part 14a of the external gear 14 in the radial direction when the elliptical cam 12a rotates.

The flange part 14b is formed in a ring shape when viewed in the axial direction as illustrated in FIG. 4. The outer circumference of the flange part 14b is fixed to the one side in the axial direction in the casing 11. The flange part 14*b* has a thick part 14*c* at the outer circumference of the flange part 14*b* which is thicker than other parts of the external gear 14. The thick part 14*c* has a plurality of through holes 14*d* penetrating the thick part in the thickness direction formed in the circumferential direction. The through holes 14*d* are provided at positions corresponding to the screw holes 11*a* of the casing 11 in a state in which the external gear 14 is disposed on the one side in the axial direction in the casing 11.

Note that a length of the flange part 14*b* projecting from the cylindrical part 14*a* radially outward has a length in which the cylindrical part 14*a* can be easily deformed when the cylindrical part is pressed due to rotation of the cam 12*a* as described above.

The internal gear 15 is a ring-shaped member as illustrated in FIG. 5 and has a plurality of internal teeth 32 formed on the inner circumferential surface thereof at a uniform pitch in the circumferential direction. The internal teeth 32 are formed on the internal circumferential surface of the internal gear 15 to extend in the axial direction. The internal gear 15 is disposed to surround the cam 12*a*, the bearing 13, and the cylindrical part 14*a* of the external gear 14 from the outside in the radial direction. The internal gear 15 has a predetermined gap between the external gear at a part in the circumferential direction so that the internal teeth 32 of the internal gear 15 mesh with the external teeth 31 of the external gear 14 when an end of the cam 12*a* in the longitudinal direction presses and deforms the external gear 14 in the radial direction.

Note that a connecting ring 20 is fixed to the internal gear 15 on the one side in the axial direction of as illustrated in FIG. 4. The connection ring 20 is rotatably supported by an inner surface of the casing 11 via the cross roller bearing 16. Note that the connecting ring 20 is fixed to the internal gear 15 using a plurality of bolts 6. Since a configuration of the cross roller bearing 16 is the same as that of a general cross roller bearing, detailed description thereof will be omitted.

The number of the internal teeth 32 of the internal gear 15 is greater than that of the external teeth 31 of the external gear 14 as illustrated in FIG. 5. Since the number of the external teeth 31 is different from the number of the internal teeth 32, a rotation speed of the internal gear 15 can be reduced further than a rotation speed of the cam 12*a* by rotating the cam 12*a* to deform the external gear 14 in the radial direction and causing of the external teeth 31 of the external gear 14 to sequentially mesh with the internal teeth 32 of the internal gear 15.

The support 19 is formed in a cylindrical shape with a flange using a plate-shaped member as illustrated in FIG. 4. The support 19 is disposed at the end of the strain wave gear speed reducer unit 2 on the one side in the axial direction such that the support 19 covers the casing 11, the external gear 14, and the internal gear 15 from the one side in the axial direction. That is, the support 19 is fixed to the casing 11 on the one side in the axial direction from the external gear 14.

Accordingly, the support 19 can position the cam 12*a* with respect to the casing 11. In addition, by connecting the support 19 to the casing 11 on the one side in the axial direction from the external gear 14, the connecting part 12*b* extending from the cam 12*a* to the one side in the axial direction can be supported by the support 19 from the one side in the axial direction. Accordingly, the cam 12*a* can be more reliably supported.

The support 19 has a cylindrical part 19*a* (cylinder part) extending in the axial direction and a flange part 19*b* provided on the one side in the axial direction in the cylindrical part 19*a*.

The cylindrical part 19*a* supports the outer circumference of the connecting part 12*b* of the rotating body 12 via the support bearings 17 and 18. Specifically, the cylindrical part 19*a* is positioned on the outer side of the connecting part 12*b* in the radial direction with respect to the support bearings 17 and 18 that are attached to the outer circumferential surface of the connecting part 12*b*. That is, the cylindrical part 19*a* has a through hole and the connecting part 12*b*, and the support bearings 17 and 18 are disposed in the through hole 19*e*.

Note that a retaining member 21 disposed between the support bearings 17 and 18 can prevent the support bearings 17 and 18 from coming off from the cylindrical part 19*a* in the axial direction.

The flange part 19*b* extends from the one side in the axial direction in the cylindrical part 19*a* radially outward and is fixed to the casing 11 on the outer circumference. The flange part 19*b* is formed in a ring shape covering the casing 11, the external gear 14, and the internal gear 15 from the one side in the axial direction when viewed from the one side in the axial direction.

A bent part 19*c* that is bent to the one side in the axial direction is formed on the outer circumference of the flange part 19*b*. The bent part 19*c* is combined with the thick part 14*c* provided on the outer circumference of the flange part 14*b* of the external gear 14 in a case where the support 19 is disposed on the one side in the axial direction from the external gear 14. Accordingly, the support 19 can be positioned with respect to the external gear 14 and the casing 11.

A plurality of through holes 19*d* penetrating the thickness direction of the flange part 19*b* are formed on the outer circumference from the bent part 19*c* in the circumferential direction. The through holes 19*d* are formed at the positions corresponding to the screw holes 11*a* and through holes 14*d* such that the screw holes 11*a* of the casing 11 are connected to the through holes 14*d* of the external gear 14 in a state in which the external gear 14 and the support 19 are disposed on the one side in the axial direction in the casing 11.

The flange part 19*b* is curved such that the inner circumference is positioned further on the one side in the axial direction than the bent part 19*c*. Accordingly, the cylindrical part 19*a* of the support 19 can energize the connecting part 12*b* of the rotating body 12 to the outer side in the axial direction via the support bearings 17 and 18. Thus, the support 19 can support the rotating body 12 in the axial direction more reliably. Moreover, by configuring the flange part 19*b* as described above, rigidity of the support 19 can be improved.

With the above-described configuration, the rotating body 12 having the cam 12*a* can be rotatably supported by the support 19 that is supported by the casing 11. Thus, the rotating body 12 can be positioned inside the casing 11 in the axial direction and the radial direction. Accordingly, when the strain wave gear speed reducer unit 2 is attached to the motor unit, there is no need to position the cam 12*a* using the rotating shaft 52.

Moreover, since the rotating body 12 has the connecting part 12*b* extending from the cam 12*a* to the one end in the axial direction, the rotating shaft 52 of the motor unit 3 can be easily connected to the connecting part 12*b*.

Due to the above-described points, it is possible to easily attach the strain wave gear speed reducer unit 2 to the motor unit 3.

In addition, since the cam 12a is disposed on the other side of the casing 11 in the axial direction (the end at the other side), the connecting part 12b is provided to extend from the cam 12a to the one side in the axial direction, and the connecting part 12b is supported by the support 19 that is disposed on the one side in the axial direction from the casing 11, the connecting part 12b and the support 19 can be disposed in the space formed on one side of the cam 12a in the axial direction. That is, the connecting part 12b and the support 19 are disposed inside the cylindrical part 14a of the external gear 14. Accordingly, the connecting part 12b and the support 19 do not much project outward the external gear 14 in the axial direction. Thus, a compact size of the strain wave gear speed reducer unit 2 can be achieved.

Therefore, the strain wave gear speed reducer unit 2 that can be easily assembled with the motor unit 3 in a compact size can be obtained using the configuration of the present embodiment.

The strain wave gear speed reducer unit 2 according to an embodiment of the present invention is a strain wave gear speed reducer unit that is rotatably connected to the rotating shaft 52 of the motor unit 3 (motor) having the rotating shaft 52 extending in the axial direction. The strain wave gear speed reducer unit 2 includes the cylindrical casing 11 extending in the axial direction, the ring-shaped internal gear 15 that is disposed in the casing 11 so as to be rotatable relative to the casing 11 and has the internal teeth 32 on an inner circumference, the flexible ring-shaped external gear 14 that is disposed to the inside of the internal gear 15 in the radial direction, is fixed to the casing 11 on the one side in the axial direction, and has the external teeth 31 that mesh with the internal teeth 32 on the outer circumference, the elliptical cam 12a that is disposed to the inside of the external gear 14 in the radial direction and deforms the external gear 14 in the radial direction by rotating together with the rotating shaft 52, the connecting part 12b that is formed integrally with the cam 12a or fixed to the cam 12a and is connected to the rotating shaft 52 of the motor unit 3 on the inside of the external gear 14, and the support 19 that is connected to the casing 11 and rotatably supports the outer circumference of the connecting part 12b.

When the elliptical cam 12a positioned in the inside of the flexible ring-shaped external gear 14 rotates together with the rotating shaft 52 of the motor unit 3, the external gear 14 can be deformed in the radial direction (wave motions are given to the external gear 14 from the inner circumference of the cam 12a). Accordingly, since parts of the external teeth 31 of the external gear 14 mesh with the internal teeth 32 of the internal gear 15, the rotation of the cam 12a can be transmitted to the internal gear 15 or the external gear 14.

The strain wave gear speed reducer with the above-described configuration can be in a compact size by forming the connecting part 12b connected to the rotating shaft 52 of the motor unit 3 integrally with the cam 12a or fixing the connecting part 12b to the cam 12a and causing the connecting part 12b to be rotatably supported by the support 19 connected to the casing 11.

That is, by providing the above-described connecting part 12b in the cam 12a, the cam 12a can be easily connected to the rotating shaft 52 of the motor unit 3. In addition, since the cam 12a is positioned by the support 19 and the connecting part 12b, there is no need to position the cam using the rotating shaft of the motor as in the related art. Accordingly, by making the strain wave gear speed reducer as a unit, the strain wave gear speed reducer unit can be easily attached to the motor unit 3.

Moreover, since the connecting part 12b is formed integrally with the cam 12a or fixed to the cam 12a and is connected to the rotating shaft 52 of the motor unit 3 on the inside of the external gear 14, the connecting part 12b does not much projects outward the external gear 14 in the axial direction. Thus, the connection structure to the motor unit 3 can become compact, and thus the strain wave gear speed reducer unit 2 in the compact size is obtained.

As described above, with the above configuration, the strain wave gear speed reducer unit 2 that can be easily attached to the motor unit 3 in a compact size is obtained.

The cam 12a is disposed at the end on the other side in the axial direction from the external gear 14. The connecting part 12b extends to the one side in the axial direction from the cam and the end thereof on the one side in the axial direction is positioned on the inner side of the support 19 in the axial direction when viewed from a direction orthogonal to the axial direction.

By providing the connecting part 12b as described above, it is possible to prevent the connecting part 12b from projecting to the one end in the axial direction from the support 19 when viewed from a direction orthogonal to the axial direction of the rotating shaft 52. Accordingly, the strain wave gear speed reducer unit 2 can be miniaturized in the axial direction.

The support 19 is fixed to the casing 11 on the one side in the axial direction from the external gear 14.

Accordingly, the cam 12a can be positioned with respect to the casing 11. That is, since the connecting part 12b that is formed integrally with the cam 12a or fixed to the cam 12a is supported by the support 19 that is fixed to the casing 11, the cam 12a can be positioned with respect to the casing 11.

In addition, since the support 19 is connected to the casing 11 on the one side in the axial direction from the external gear 14, the connecting part 12b that is formed integrally with the cam 12a or fixed to the cam 12a can be supported by the support 19 from the one side in the axial direction. Accordingly, the cam 12a can be supported more reliably.

The strain wave gear speed reducer unit 2 further includes the support bearings 17 and 18 (bearings) disposed on the outer circumferential surface of the connecting part 12b. The support 19 supports the support bearings 17 and 18 against the casing 11.

Accordingly, the connecting part 12b that is formed integrally with the cam 12a or fixed to the cam 12a can be rotatably supported with respect to the casing 11.

The support 19 has the cylindrical part 19a (cylinder part) having the through hole 19e in which the connecting part 12b and the support bearings 17 and 18 can be disposed, and the flange part 19b that extends from the one side in the axial direction in the cylindrical part 19a to a direction orthogonal to the axial direction. The outer circumference of the flange part 19b is fixed to the casing 11. The cylindrical part 19a supports the connecting part 12b via the support bearings 17 and 18.

Accordingly, the connecting part 12b that is formed integrally with the cam 12a or fixed to the cam 12a can be rotatably supported by the support 19 more reliably.

A plurality of support bearings 17 and 18 are disposed in a row in the axial direction. Accordingly, the connecting part 12b that is formed integrally with the cam 12a or fixed to the cam 12a can be rotatably supported by the support 19 more reliably.

The cam 12a and the connecting part 12b are a single component. Accordingly, the number of components of the strain wave gear speed reducer unit 2 can be reduced, and assembly workability of the strain wave gear speed reducer unit 2 can be improved.

Other Embodiments

Although the embodiment of the present invention has been described above, the above-described embodiment is merely an example for implementing the present invention. Thus, the invention is not limited to the above-described embodiment, and the above-described embodiment can be appropriately modified with a scope not departing from the gist of the invention.

Figure 6:
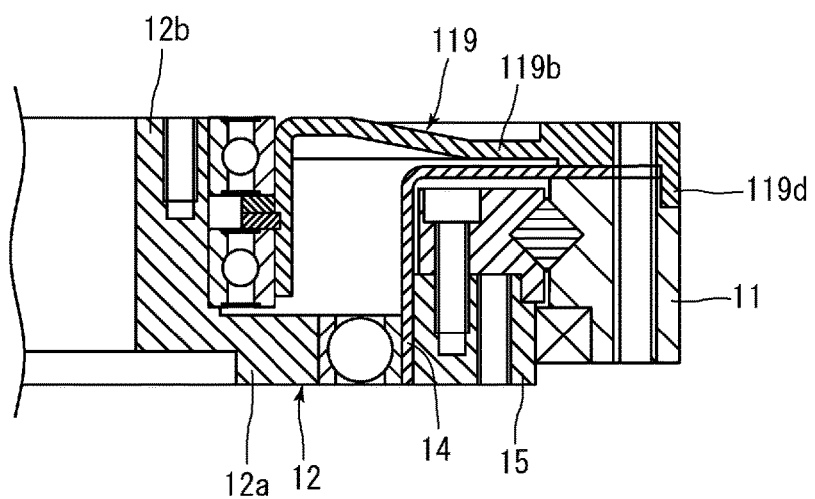
FIG. 6 is a cross-sectional diagram illustrating a schematic configuration of a strain wave gear speed reducer unit according to another embodiment.

In the above-described embodiment, the support 19 that supports the connecting part 12b of the rotating body 12 is fixed to the casing 11 by the bolts 4 that connect the motor unit 3 to the strain wave gear speed reducer unit 2. However, by providing a protrusion part 119d at an outer circumferential end of a flange part 119b of a support 119, the protrusion part 119d may be fixed to the outer circumference of the casing 11 as illustrated FIG. 6. Accordingly, it is possible to prevent the support 119 from detaching from the strain wave gear speed reducer unit.

In the above-described embodiment, the cam 12a and the connecting part 12b are formed integrally in the rotating body 12. However, the connecting part may be a separate body from the cam and fixed to the cam.

In the above-described embodiment, the rotating body 12 is formed in a cylindrical shape. However, the rotating body may be a columnar shape.

In the above-described embodiment, the support 19 has the cylindrical part 19a and the flange part 19b. However, the support 19 may have any configuration as long as the support can support the outer circumference of the connecting part 12b of the rotating body 12.

In the above-described embodiment, the motor unit 3 to which the strain wave gear speed reducer unit 2 is attached is an axial gap-type motor. However, the motor unit to which the strain wave gear speed reducer unit 2 is attached may be any motor with another configuration, such as a radial gap-type motor.

INDUSTRIAL APPLICABILITY

The present invention is applicable to a strain wave gear speed reducer unit connected to a motor unit.

The invention claimed is:

1. A strain wave gear speed reducer unit that is rotatably connected to a rotating shaft of a motor having the rotating shaft extending in an axial direction, the strain wave gear speed reducer unit comprising:
a cylindrical casing that extends in the axial direction;
a ring-shaped internal gear that is disposed in the casing so as to be rotatable relative to the casing and has internal teeth on an inner circumference of the internal gear;
a flexible ring-shaped external gear that is disposed to an inside of the internal gear in a radial direction orthogonal to the axial direction, wherein an end of the external gear is fixed to the casing on one side in the axial direction, and has external teeth that mesh with the internal teeth on an outer circumference of the external gear;
an elliptical cam that is disposed to an inside of the external gear in the radial direction and deforms the external gear in the radial direction by rotating together with the rotating shaft;
a connecting part that is formed integrally with the cam or fixed to the cam and is connected to the rotating shaft of the motor on the inside of the external gear; and
a support that is fixed to the casing and rotatably supports an outer circumference of the connecting part,
wherein the support has
a cylindrical part that surrounds and supports the connecting part via a bearing, and
a flange part that extends in the radial direction from the one side in the axial direction from the cylindrical part, and
wherein the cylindrical part and the flange part are composed of a plate-shaped member, and
wherein the support is elastically deformable in the axial direction,
wherein the cam is disposed at an end on another side in the axial direction from a part of the external gear, and
wherein the connecting part extends to the one side in the axial direction from the cam and the end on the one side in the axial direction is positioned on an inner side of the support in the axial direction when viewed from a direction orthogonal to the axial direction,
wherein the bearing is disposed on an outer circumferential surface of the connecting part,
wherein the support supports the bearing,
wherein the bearing comprises a plurality of bearings that are disposed in a row on the one side in the axial direction of the cam.

2. The strain wave gear speed reducer unit according to claim 1,
wherein the support is fixed to the casing on the one side in the axial direction from the external gear.

3. The strain wave gear speed reducer unit according to claim 1,
wherein the cam and the connecting part are a single component.

4. The strain wave gear speed reducer unit according to claim 1,
wherein the flange part is curved such that an inner circumference of the flange part is positioned further on the one side in the axial direction than an outer circumference of the flange part.

5. A power unit, formed by connecting the strain wave gear speed reducer unit and the motor in the axial direction according to claim 1,
wherein the motor comprises a cylindrical motor casing that extends in the axial direction,
the rotating shaft is positioned in the motor casing,
the motor casing, the support and the casing are fixed by bolts, and
the connecting part is fixed to the rotating shaft.

6. A strain wave gear speed reducer unit that is rotatably connected to a rotating shaft of a motor having the rotating shaft extending in an axial direction, the strain wave gear speed reducer unit comprising:
a cylindrical casing that extends in the axial direction;
a ring-shaped internal gear that is disposed in the casing so as to be rotatable relative to the casing and has internal teeth on an inner circumference of the internal gear;
a flexible ring-shaped external gear that is disposed to an inside of the internal gear in a radial direction orthogonal to the axial direction, wherein an end of the external gear is fixed to the casing on one side in the axial direction, and has external teeth that mesh with the internal teeth on an outer circumference of the external gear;

an elliptical cam that is disposed to an inside of the external gear in the radial direction and deforms the external gear in the radial direction by rotating together with the rotating shaft;

a connecting part that is formed integrally with the cam or fixed to the cam and is connected to the rotating shaft of the motor on the inside of the external gear; and a support that is fixed to the casing and rotatably supports an outer circumference of the connecting part, wherein the support has a cylindrical part that surrounds and supports the connecting part via a bearing, and a flange part that extends in the radial direction from the one side in the axial direction from the cylindrical part, and wherein the cylindrical part and the flange part are composed of a plate-shaped member, and wherein the support is elastically deformable in the axial direction, wherein the flange part is curved, and a bent part is formed on an outer circumference of the flange part.

7. The strain wave gear speed reducer unit according to claim 6, wherein the bent part extends from the outer circumference of the flange part, and extends from an edge of the flange part from the another side in the axial direction of the flange part to the one side in the axial direction.

8. The strain wave gear speed reducer unit according to claim 6, wherein the flange part is bent such that an inner circumference side of the flange part is located closer to the another side in the axial direction compared to an outer circumference side of the flange part.

9. The strain wave gear speed reducer unit according to claim 8, wherein at least a portion of the flange part is disposed closer to the one side in the axial direction compared to an edge of the bent part located at the one side in the axial direction of the flange part.

10. The strain wave gear speed reducer unit according to claim 6, wherein at least a portion of the flange part is disposed closer to the one side in the axial direction compared to an edge of the bent part located at the one side in the axial direction of the flange part.

11. The strain wave gear speed reducer unit according to claim 6, wherein the casing, the flange part, the external gear, a radial edge of a motor casing are at a same location in a radial direction.

12. The strain wave gear speed reducer unit according to claim 6, wherein a through hole is formed at an outer circumference side of the bent part penetrating a thickness direction of the support.

* * * * *